United States Patent
Casaccia et al.

(10) Patent No.: US 6,862,132 B1
(45) Date of Patent: Mar. 1, 2005

(54) SUPPRESSION OF DOUBLE RAYLEIGH BACKSCATTERING AND PUMP REUSE IN A RAMAN AMPLIFIER

(75) Inventors: Emilio Casaccia, Monza (IT); Fabrizio Di Pasquale, Milan (IT); Giorgio Grasso, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 09/929,738

(22) Filed: Aug. 13, 2001

(51) Int. Cl.$^7$ ................................................ H01S 3/00
(52) U.S. Cl. .................... 359/334; 359/341.32
(58) Field of Search ............................ 359/334, 341.32

(56) References Cited

U.S. PATENT DOCUMENTS

| | | | |
|---|---|---|---|
| 5,283,686 A | * | 2/1994 | Huber .......................... 359/337 |
| 6,320,884 B1 | * | 11/2001 | Kerfoot et al. ................. 372/3 |
| 6,388,800 B1 | * | 5/2002 | Christodoulides et al. ... 359/334 |
| 2001/0024721 A1 | * | 9/2001 | Bohm et al. ............ 428/355 R |
| 2001/0041719 A1 | * | 11/2001 | Okuno et al. ............... 359/334 |
| 2002/0041430 A1 | * | 4/2002 | Fludger et al. ............. 359/334 |
| 2002/0081069 A1 | * | 6/2002 | Yeniay et al. .................. 385/39 |
| 2002/0159131 A1 | * | 10/2002 | Bartolini et al. ............ 359/334 |
| 2002/0159132 A1 | * | 10/2002 | Grochocinski et al. ..... 359/334 |

OTHER PUBLICATIONS

Hecht, Jeff. Understanding Fiber Optics. 2nd Edition. 1993. p. 234.*

"Broadband High–Gain Dispersion Compensating Raman Amplifier" by S.A.E. Lewis, S.V. Chernikov and J.R. Taylor; Electronics Letters, Aug. 3, 2000, vol. 36, No. 11, pp. 1355–1356.

"Characterization of Double Rayleigh Scatter Noise in Raman Amplifiers" by S.A.E. Lewis, S.V. Chernikov and J.R. Taylor; IEEE Photonic Technology Letters, vol. 12, No. 5, May 2000.

"Rayleigh Crosstalk in Long Cascades of Distributed Unsaturated Raman Amplifiers" by M. Nissov, K. Rottwitt, H.D. Kidorf and M.X. Ma; Electronics Letters, Jun. 10, 1999, vol. 35, No. 12, pp. 997–998.

* cited by examiner

Primary Examiner—Thomas H. Tarcza
Assistant Examiner—Deandra M. Hughes
(74) Attorney, Agent, or Firm—Ritter, Lang & Kaplan LLP

(57) ABSTRACT

Systems and methods for ameliorating double Rayleigh backscattering induced impairments are provided. Raman amplification is divided among two or more stages. Optical energy from a single counter-propagating pump may traverse multiple stages while optical energy at the frequency of the signal to be amplified is permitted to propagate in the forward direction only. In this way the pump power can be effectively distributed over the entire amplifier length. The scheme may be implemented in a simple configuration employing a closed circulator and a fiber Bragg grating. Multiple wavelength pump operation may be accommodated as well as either discrete or distributed Raman amplification.

36 Claims, 11 Drawing Sheets

SUPPRESSION OF DOUBLE RAYLEIGH BACKSCATTERING AND PUMP REUSE IN A RAMAN AMPLIFIER

BACKGROUND OF THE INVENTION

The present invention relates to optical communication systems and more particularly to amplification in optical communication systems.

The explosion of communication services, ranging from video teleconferencing to electronic commerce, has spawned a new era of personal and business interactions. As evident in the rapid growth of Internet traffic, consumers and businesses have embraced broadband services, viewing them as a necessity. However, this enormous growth in traffic challenges the telecommunication industry to develop technology that will greatly expand the bandwidth limitations of existing communication systems. Further improvements in optical communications hold great promise to meet the continual demand for greater and greater bandwidth.

Wavelength division multiplexing (WDM) technology, in particular dense WDM (DWDM), permits the concurrent transmission of multiple channels over a common optical fiber. The advent of erbium-doped Fiber Amplifiers (EDFA) has accelerated the development of WDM systems by providing a cost-effective optical amplifier that is transparent to data rate and format. An EDFA amplifies all the wavelengths simultaneously, enabling the composite optical signals to travel large distances (e.g., 600 km) without regeneration.

One of the principal limitations of EDFA technology is limited bandwidth. Discrete and distributed Raman amplifiers have been developed to overcome this limitation. They provide very high gain across a wide range of wavelengths. Moreover, discrete and distributed Raman amplifiers increase the distance between optical regeneration points, while allowing closer channel spacing.

The operation of Raman amplifiers involves transmitting high-power laser pump energy down a fiber in a counter-propagating or co-propagating direction relative to the propagation direction of the WDM signal to be amplified. The pump energy amplifies the WDM signal.

One of the major limitations to the performance of Raman amplifiers (both discrete and distributed) is double Rayleigh backscattering of the signal resulting from amplification of certain unwanted signal reflections. It is known to ameliorate double Rayleigh backscattering by dividing up amplifiers into multiple isolated stages using different pumps, thus limiting the path length over which undesirable reflections may travel. This approach, however, leads to inefficient use of counter-propagating pump power, which cannot be readily distributed among isolated stages. Another approach relies on a complex configuration including 3 circulators and an interference filter and permits the energy of a single pump to be divided up over no more than 2 amplification stages.

What is needed are systems and methods for Raman amplification that ameliorate double Rayleigh backscattering while optimally employing pump resources and minimizing complexity. It would farther be desirable to allow the energy from a single pump to be distributed among as many amplifier stages as desired.

SUMMARY OF THE INVENTION

Systems and methods for ameliorating double Rayleigh backscattering are provided by virtue of one embodiment of the present invention. Raman amplification is divided among two or more stages. Optical energy from a single counter-propagating pump may traverse multiple stages while optical energy at the frequency of the signal to be amplified is only permitted to propagate between stages in the forward direction. In this way the pump power can be effectively used for the entire amplifier length. The scheme may be implemented in a simple configuration employing a closed circulator and a fiber Bragg grating. Multiple wavelength pump operation may be accommodated as well as either discrete or distributed Raman amplification.

A first aspect of the present invention provides apparatus for amplifying an optical signal. The apparatus includes: a pump system disposed to inject optical pump energy into a first end of a first fiber segment so as to counter-propagate relative to an optical signal traversing the first fiber segment and a second fiber segment, and an optical filter structure coupled to a second end of the first fiber segment and a first end of the second fiber segment. The optical signal propagates through the optical filter structure from the second fiber segment to the first fiber segment. The optical pump energy propagates through the optical filter structure from the first fiber segment to the second fiber segment. The optical filter structure substantially blocks energy at a frequency of the optical signal from traveling from the first fiber segment into the second fiber segment. Raman amplification is induced in the first fiber segment and the second fiber segment and double Rayleigh backscattering effects are ameliorated.

A second aspect of the present invention provides a method for amplifying an optical signal. The method includes: injecting optical pump energy into a first end of a first fiber segment so that the optical pump energy counter-propagates relative to an optical signal traversing the first fiber segment and a second fiber segment, passing the optical signal from the second fiber segment into a second end of the first fiber segment with low loss; passing the optical pump energy from the first fiber segment into the second fiber segment with low loss, and blocking optical energy at a frequency of the optical signal from entering the second fiber segment from the first fiber segment.

Further understanding of the nature and advantages of the inventions herein may be realized by reference to the remaining portions of the specification and the attached drawings.

DESCRIPTION OF SPECIFIC EMBODIMENTS

Raman Amplification Overview

Figure 1:
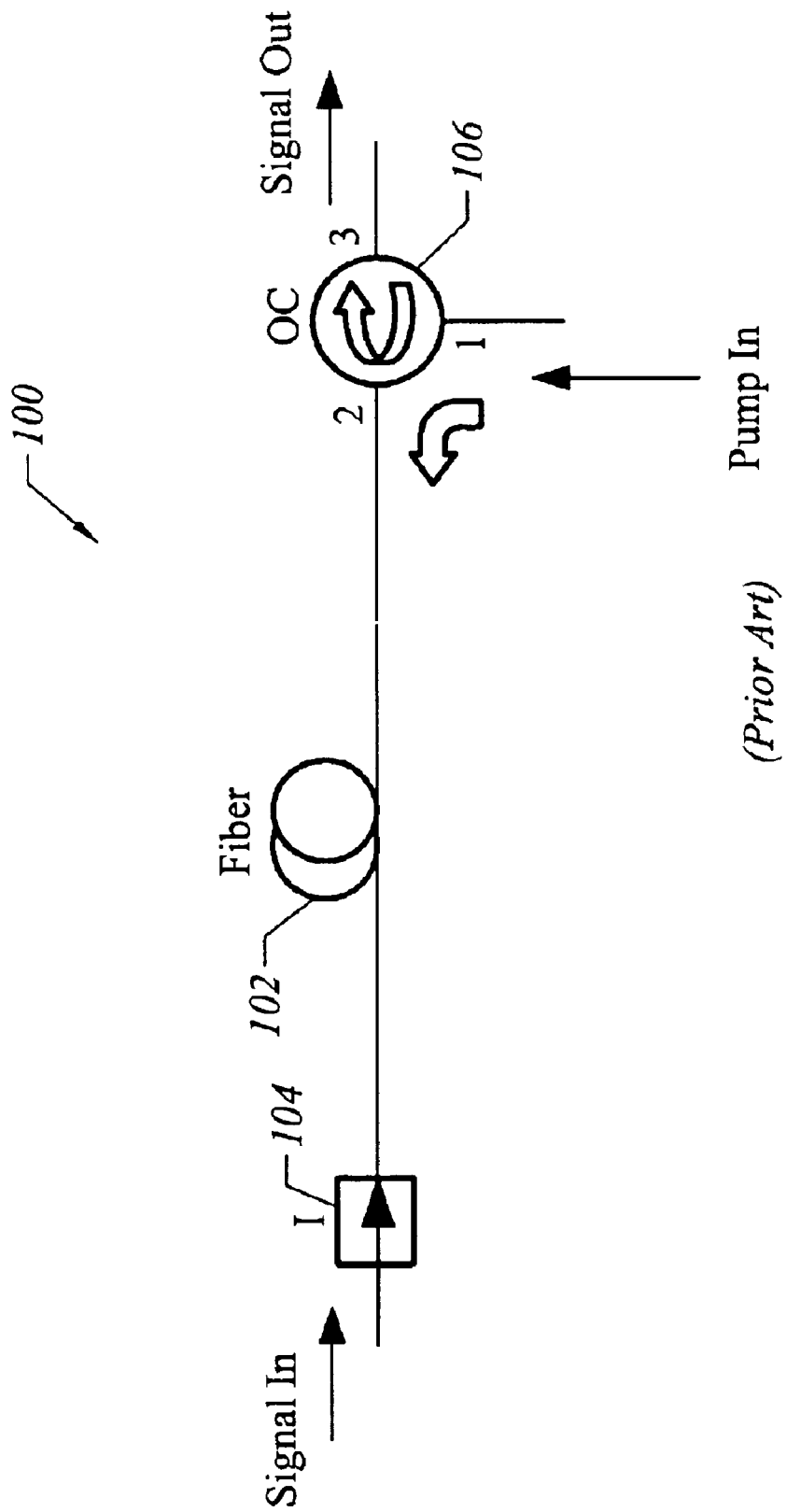
FIG. 1 depicts a prior art single-stage counter-pumped Raman amplifier

FIG. 1 illustrates a representative Raman amplifier 100 employing a counter-propagating pump. Raman amplifier 100 includes a spool of fiber 102, an optical isolator 104 and an open circulator 106 (depicted as "OC"). A WDM coupler may substitute for open circulator 106. The signal enters Raman amplifier 100 through optical isolator 104 and is amplified while traveling along fiber spool 102 by pump energy originating with a laser pump (not shown) via stimulated Raman amplification. The pump energy, which is inserted through port 1 of circulator 106, should be at a wavelength about 100 nm below the signal wavelength to maximize amplification efficiency for standard telecommunication transmission fibers. Optimal efficiency is obtained by employing fiber with a small effective area and high Raman gain coefficient, for example, dispersion compensating fiber (DCF). Although Raman amplifiers may employ both co-propagating and counter-propagating pumping schemes, the latter technique is the more widely used and is depicted here.

The present invention finds applications in conjunction with counter-propagating pump schemes. Also, although the discussion here focuses on discrete Raman amplifiers, the present invention applies equally to distributed Raman amplifiers.

Double-Rayleigh Back-scattering in Raman Amplifiers

It is well known that double Rayleigh backscattering, (referred to herein as "DRS"), of the signal being amplified limits the performance of Raman Amplifiers. As the signal propagates through the fiber, a portion is reflected and re-reflected by the medium itself. The resulting double reflected signals are amplified with the same local gain experienced by the signal and result in an interferometric noise at the output of the amplifier.

Figure 2:
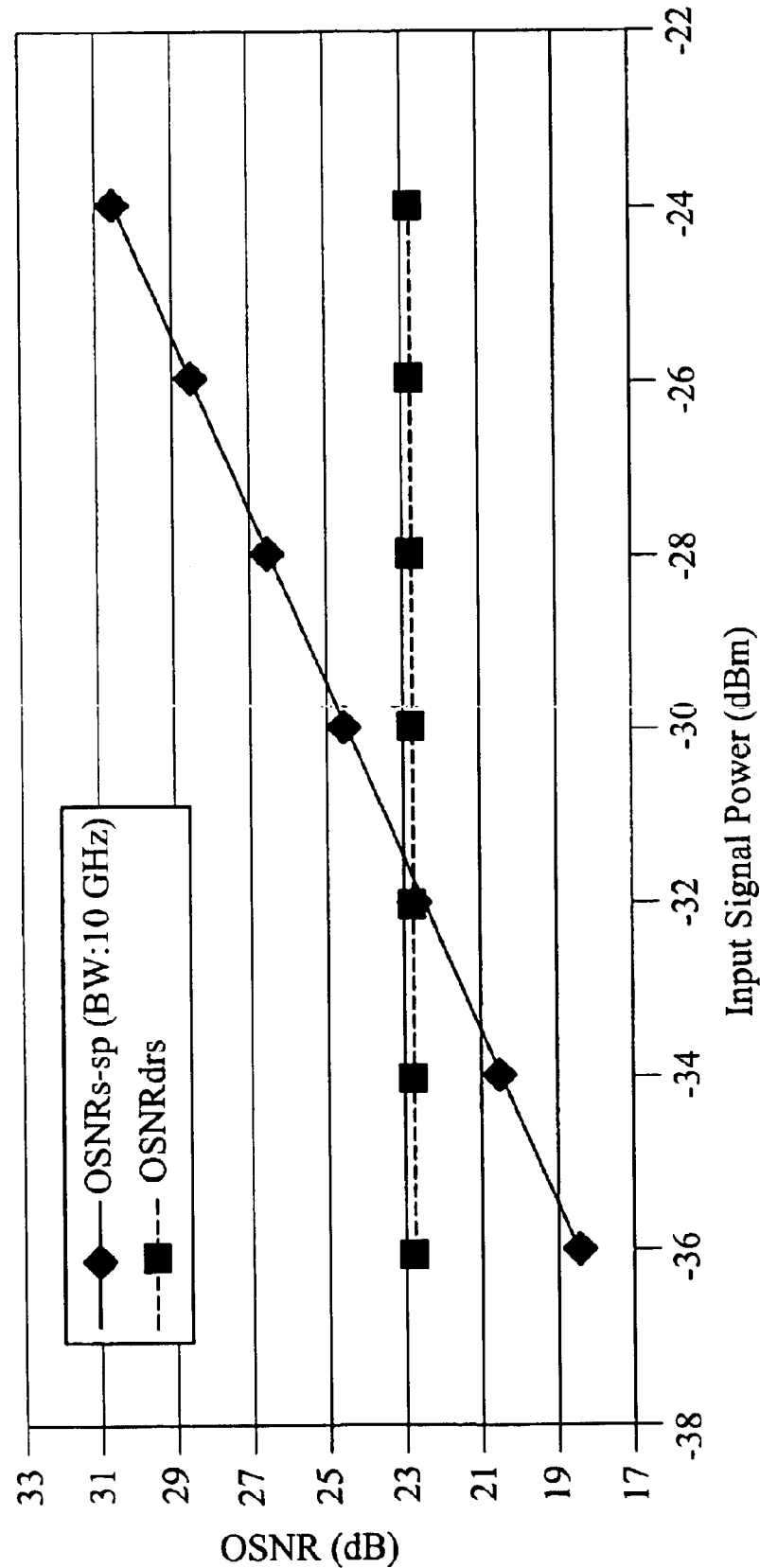
FIG. 2 depicts optical signal to noise ratio (OSNR) due to amplified spontaneous emission (ASE) and due to double Rayleigh scattering (DRS) noise versus input signal power for a single-stage Raman amplifier as in FIG. 1.

FIG. 2 shows DRS noise effects in a single stage amplifier such as the one shown in FIG. 1. The plot assumes use of a section of 16 km of DSF with an effective area of 50 um$^2$ and a DRS coefficient of $10^{-7}$ m$^{-1}$. The attenuation coefficients for the signal and the pump are assumed to be 0.225 dB/km and 0.26 dB/km respectively. FIG. 2 plots the optical signal to noise ratio, OSNR, (on 10 GHz resolution bandwidth) versus the input signal power for two different noise sources. The OSNR due to amplified spontaneous emission, ASE, noise is represented by a solid line. A dashed line represents the OSNR due to DRS. While the ASE-induced OSNR improves as input signal power increases, the OSNR caused by DRS remains constant because it depends on the amplifier gain and not on the input signal power. As FIG. 2 shows, the overall OSNR is largely determined by DRS even for very low input powers such as ~−32 dBm.

A Previous Approach to DRS

Figure 3:
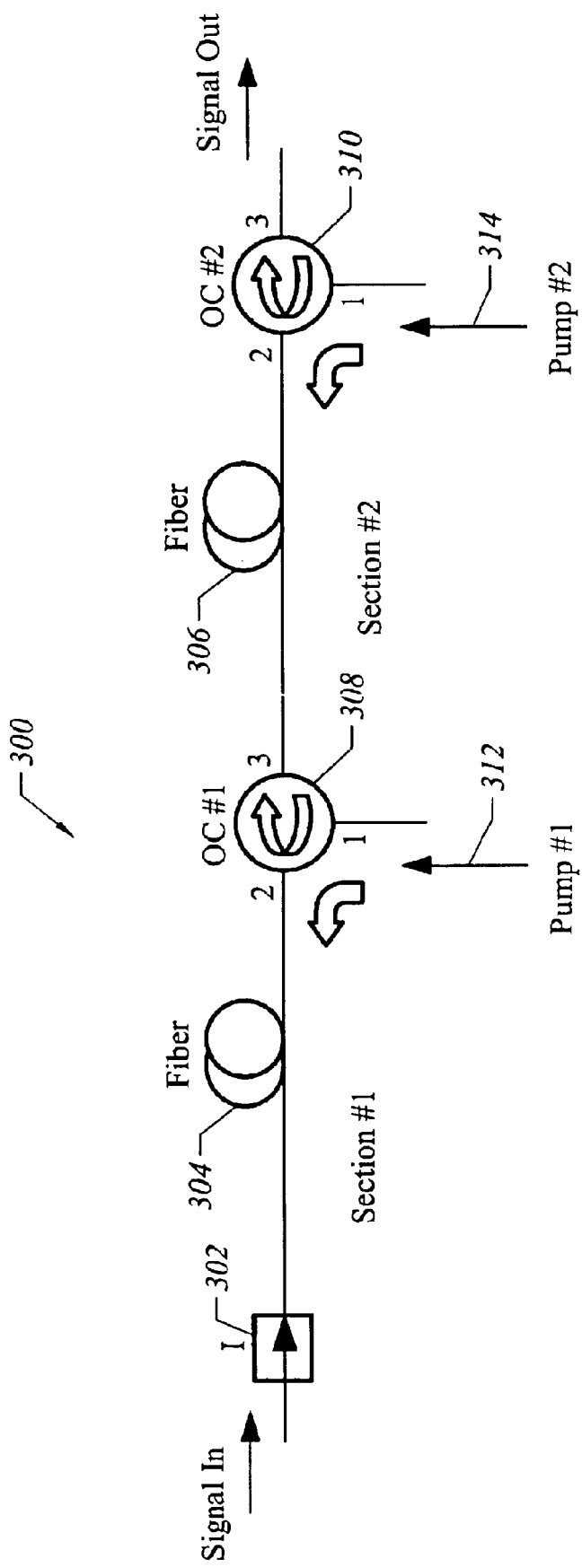
FIG. 3 depicts a prior art two-stage counter-pumped Raman amplifier

Since DRS increases with the length of amplifying fiber traversed by the WDM signal and its reflection products, an effective way to reduce the build up of DRS is to divide up Raman amplification among multiple stages separated by optical isolators. FIG. 3 depicts a 2-stage amplifier 300 that follows this approach. Amplifier 300 includes an optical isolator 302 at the input, two spools of fibers 304 and 306, two open circulators 308 and 310 and two counter-propagating pumps 312 and 314. While the signal is amplified by both stages, the build up of DRS is broken by the mid-stage circulator 308 that acts effectively as an isolator for counter-propagating DRS energy.

This architecture requires one pump for each stage and does not allow pump reuse among stages. The residual pump energy of pump 314 present at the input to fiber 306 is blocked from reaching fiber 304. This represents a very inefficient use of pump resources.

An Improved System for Ameliorating DRS

Figure 4:
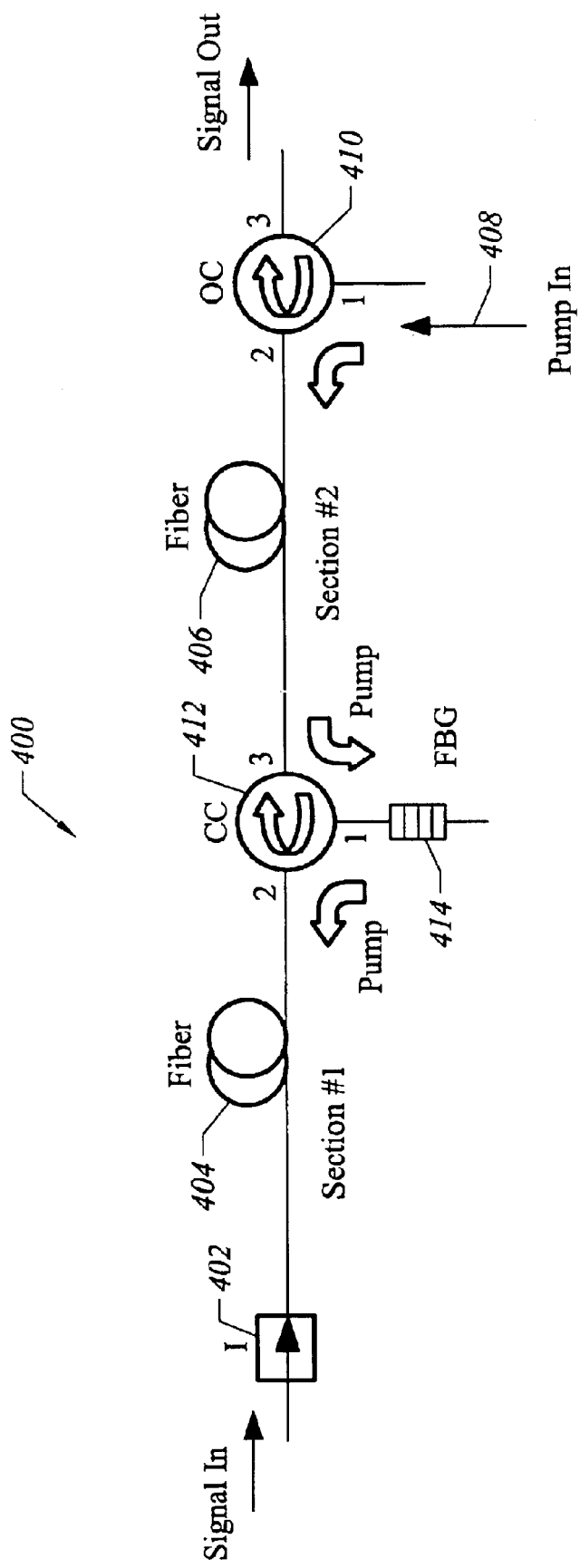
FIG. 4 depicts a two-stage counter-pumped Raman amplifier with pump reuse according to one embodiment of the present invention.

FIG. 4 depicts a two-stage counter-pumped Raman amplifier 400 with pump reuse according to one embodiment of the present invention. An optical isolator 402 couples input into amplifier 400 while blocking counter-propagating pump energy and products of signal scattering. A first stage of amplification occurs within a spool of fiber 404. A second stage of amplification occurs within a spool of fiber 406. A single pump 408 provides pump energy for both stages. An open circulator 410 ("OC") is used to couple the pump energy into the second stage spool of fiber 406.

A closed circulator 412 ("CC") is used to couple or block optical energy flowing between the amplifier stages. In closed three-port optical circulators such as circulator 412, ports 3 and 1 are optically connected with low loss, whereas in open three-port optical circulators the same ports are optically isolated. Signal energy propagates freely from the first stage to the second stage by entering circulator 412 at port 2 and exiting at port 3. In one embodiment, the signal energy experiences less than 0.5 dB of attenuation between the first stage and the second stage.

Counter-propagating optical energy is handled in a wavelength-selective manner by the operation of a fiber Bragg grating (FBG) 414. Fiber Bragg grating (FBG) 414 is configured to reflect energy at the pump frequency and absorb energy at the signal frequency. Counter-propagating optical energy enters circulator 412 at port 3, exits circulator 412 at port 1 and encounters FBG 414. Optical energy at the pump wavelength, e.g., the pump energy, reflects off FBG 414, reenters circulator 412 at port 1 and exits circulator 412 at pump 2 and thus enters the first stage. In one embodiment, the pump energy experiences a loss of less than 1 dB between the stages. By contrast, optical energy at the signal frequency, e.g., scattering products, are absorbed by FBG 414 and cannot enter the first amplifier stage. In this way, DRS effects are attenuated while pump energy from a single source is allowed to counter-propagate through both stages.

Figure 5:
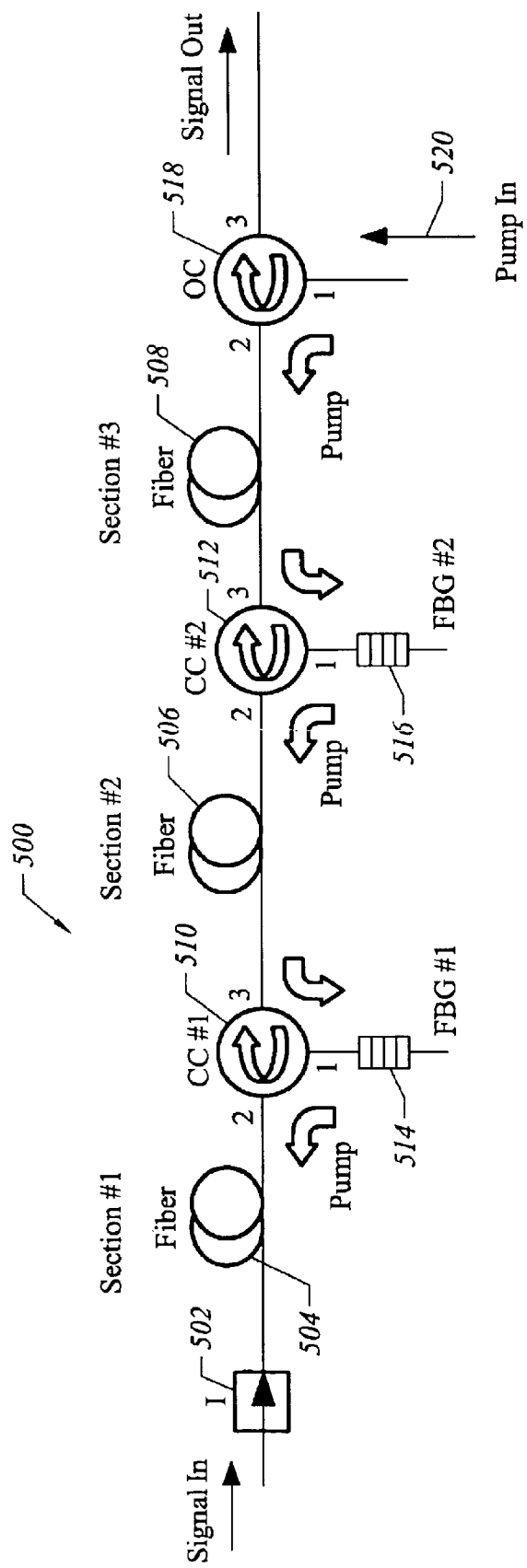
FIG. 5 depicts a three-stage counter-pumped Raman amplifier with pump reuse according to one embodiment of the present invention.

Another advantage of the architecture of FIG. 4 is that it may be readily extended to more than 2 stages, allowing for even further reduction of DRS effects. FIG. 5 depicts a three-stage counter-pumped Raman amplifier 500 with pump reuse according to one embodiment of the present invention. Amplifier 500 includes an optical isolator 502, three spools of fiber 504, 506, and 508, two closed circulators 510 and 512, two FBGs 514 and 516 and an open three-port optical circulator 518 at the output. The energy from a single pump 520 counter-propagates through the multiple sections via circulators 510 and 512 and FBGs 514 and 516. However, analogous to the operation of amplifier 400 of FIG. 4, counter-propagation of scattering products is blocked by absorption by FBGs 514 and 516.

Figure 6:
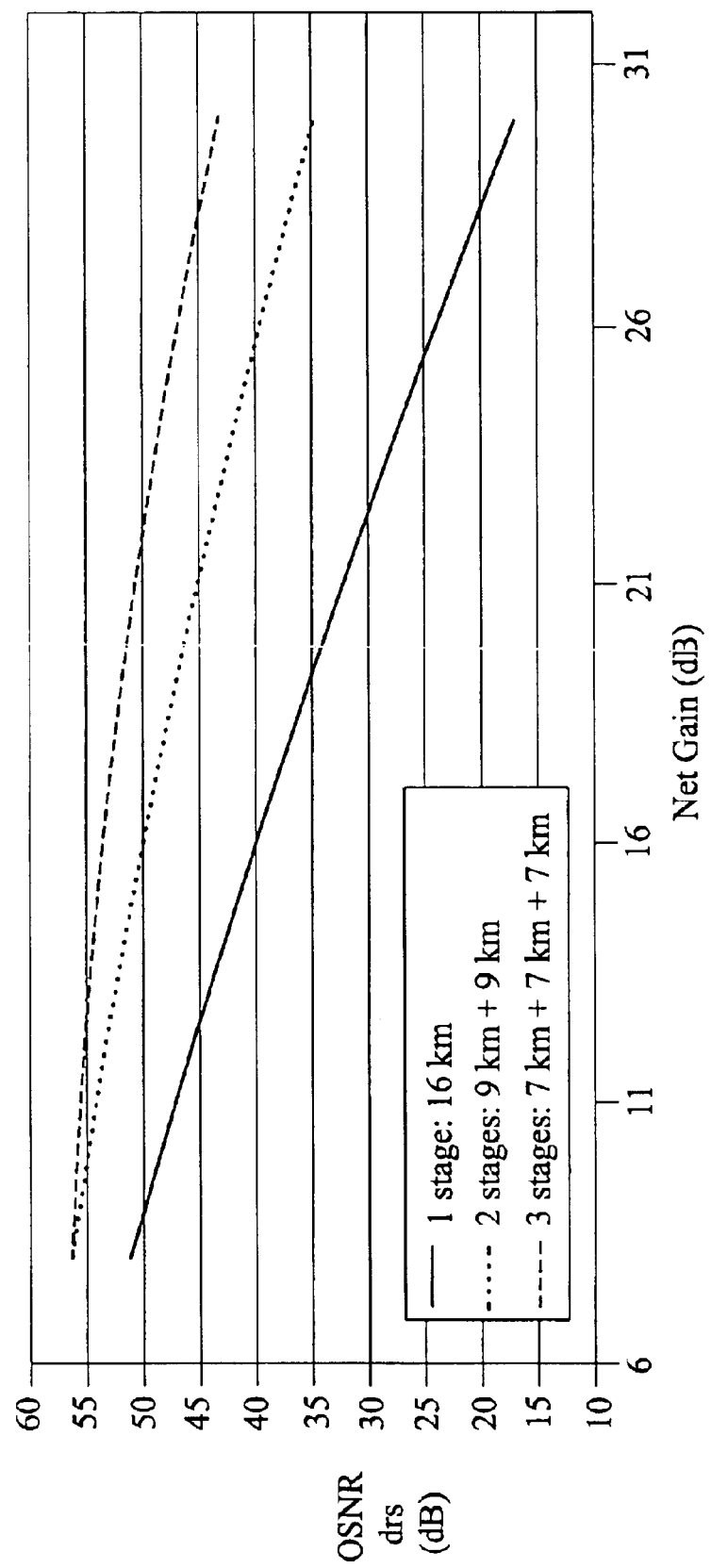
FIG. 6 depicts simulated measurements of OSNR due to DRS noise versus Raman gain for a prior art single-stage amplifier and for two-stage and three-stage Raman amplifiers employing pump reuse according to one embodiment of the present invention.

FIG. 6 depicts how OSNR due to DRS varies versus Raman gain for a prior art single-stage amplifier and for two-stage and three-stage Raman amplifiers employing pump reuse according to one embodiment of the present invention. For the simulation DSF is used with an assumed effective area of 50 um$^2$ and an assumed DRS coefficient of $10^{-7}$ m$^{-1}$. The attenuation coefficients assumed for the signal and the pump are 0.225 dB/km and 0.26 dB/km respectively. The solid curve shows data for a single-stage Raman amplifier with a section of 16 km of dispersion shifted fiber (DSF). The dotted curve shows data for the Raman amplifier of FIG. 4 with two fiber sections with 9 km of DSF each. The dashed curve shows data for a three-stage Raman amplifier as in FIG. 5 with three fiber sections having 7 km of DSF each.

FIG. 6 shows that the OSNR improvement depends on the net gain. For a 20 dB gain, there is an improvement of more than 10 dB using the two-stage architecture of FIG. 4 and an improvement of 15 dB using the three-stage architecture of FIG. 5. In accordance with the present invention, this improvement is achieved using a single pump that is reused for multiple stages. Amplification efficiency is thus greatly enhanced.

Figure 7:
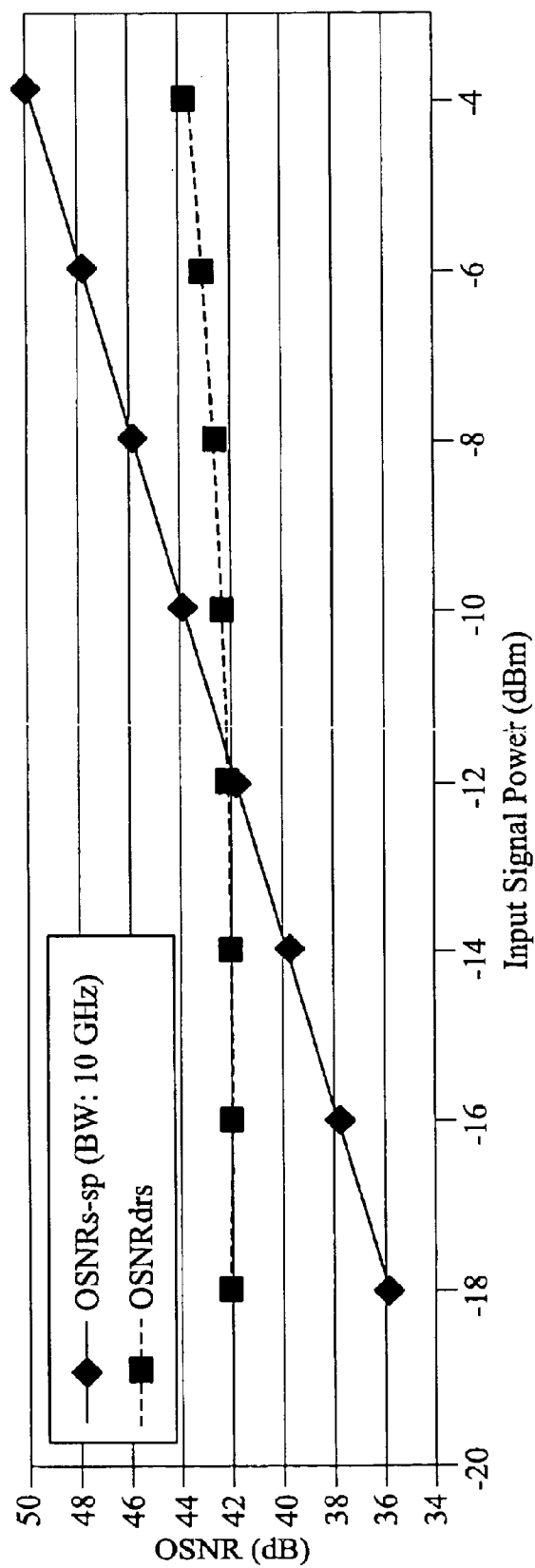
FIG. 7 depicts OSNR due to ASE and OSNR due to DRS noise versus input signal power for a two-stage Raman amplifier employing pump reuse according to one embodiment of the present invention.

FIG. 7 depicts OSNR due to ASE and OSNR due to DRS noise versus input signal power for a two-stage Raman amplifier employing pump reuse according to one embodiment of the present invention. A 10 GHz resolution bandwidth was used in generating the plot. A solid curve plots ASE-induced OSNR while a dotted curve plots DRS-induced OSNR. The plotted data assumes a Raman amplifier as in FIG. 4 employing two 9 km long sections of DSF fiber having an effective area of 50 um$^2$ and a DRS coefficient of $10^{-7}$ m$^{-1}$. The assumed attenuation coefficients for the signal and the pump are 0.225 dB/km and 0.26 dB/km respectively.

FIG. 7 shows that DRS does not become the dominant contributor to OSNR performance until input power reaches approximately −12 dBm. This represents an improvement of 20 dB when compared with the results plotted in FIG. 2 for a single-stage Raman amplifier. Since fiber optic system transmission powers are typically below −20 dBm, DRS is effectively removed as a noise source.

Figure 8:
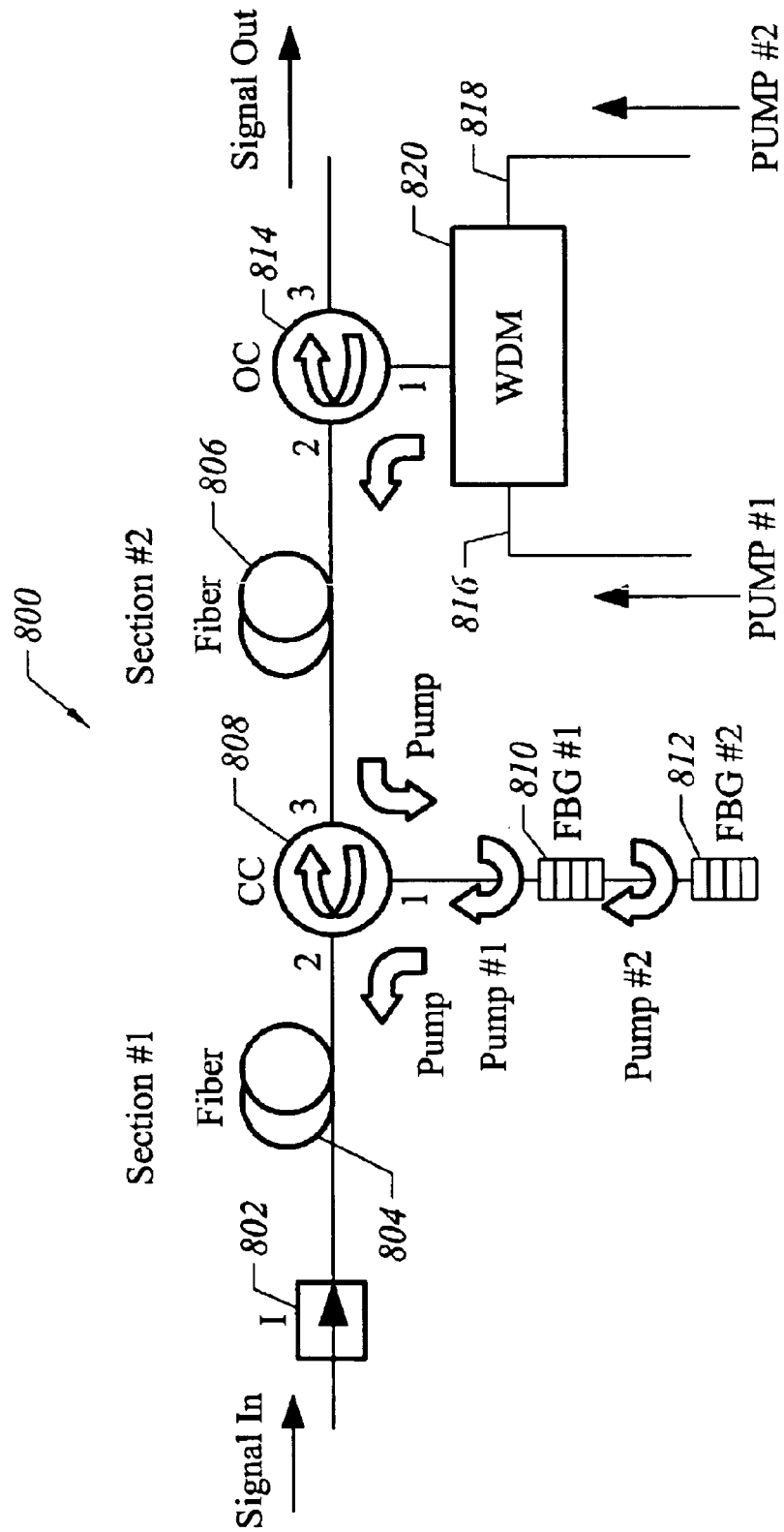
FIG. 8 depicts a two-stage counter-pumped Raman amplifier employing two pump wavelengths with pump reuse according to one embodiment of the present invention.

In order to achieve greater gain flatness, it is desirable to use multiple pumps at different wavelengths. FIG. 8 depicts a two-stage counter-pumped Raman amplifier 800 employing two pump wavelengths with pump reuse according to one embodiment of the present invention. As is shown in FIG. 8, the amplifier architecture of FIG. 4 may be readily modified to accommodate multiple pump wavelengths.

Raman amplifier 800 includes an optical isolator 802 at the input, two spools of fiber 804 and 806, a closed optical circulator 808, two FBGs 810 and 812, an open optical circulator 814, two laser pumps 816 and 818, and a wavelength division multiplexer (WDM) 820. Pumps 816 and 818 transmit at different wavelengths. The pump outputs are multiplexed together by WDM multiplexer 820 and coupled to the fiber by circulator 814.

The operation of amplifier 800 is similar to that of amplifier 400 of FIG. 1. Here, however, each pump has its own FBG to reflect its energy and permit the pump energy to counter-propagate into fiber section 804. For example, FBG 810 reflects all optical energy at the wavelength of pump 816 while FBG 812 reflects all optical energy at the wavelength of pump 818. All other optical energy including signal scattering products are absorbed and not permitted to enter fiber section 804. In this way the energy from both pumps is used to provide amplification in both stages while DRS effects are ameliorated by the frequency-selective isolation provided by the operation of circulator 808 in conjunction with FBGs 810 and 812.

Figure 9:
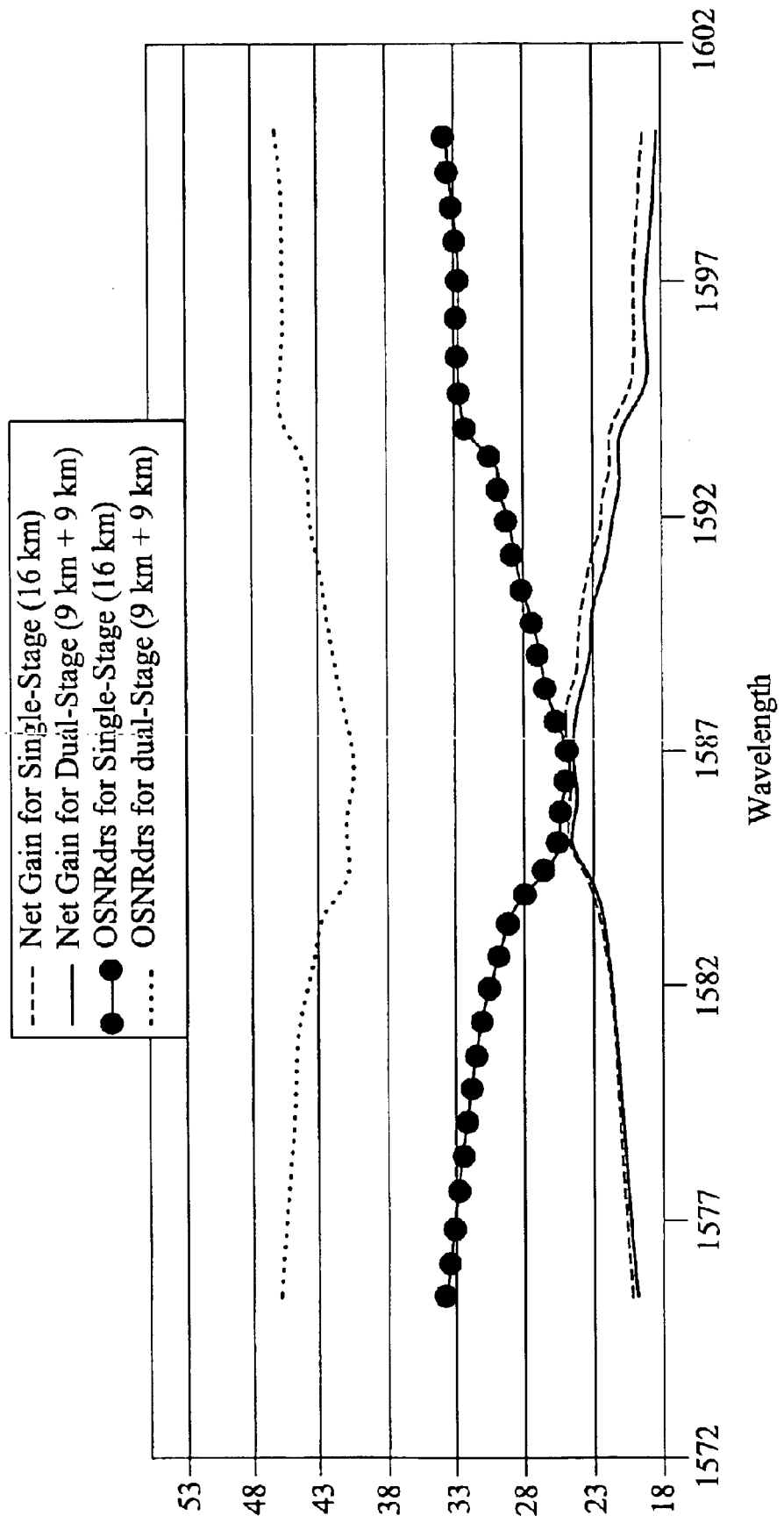
FIG. 9 depicts net gain and OSNR due to DRS noise for a prior art single-stage Raman amplifier and for a two-stage Raman amplifier employing two pump wavelengths with pump reuse according to one embodiment of the present invention.

FIG. 9 depicts net gain and OSNR due to DRS for a prior-art single stage Raman amplifier and for a two-stage Raman amplifier employing two pump wavelengths with pump reuse according to one embodiment of the present invention. A dashed curve plots net gain (dB) versus wavelength (nm) for a single stage Raman dual-pumped amplifier employing 16 km of DSF. A solid curve plots net gain versus wavelength for a two-stage Raman amplifier as in FIG. 8 made of two sections of DSF that are both 9 km long. A line denoted by dark circles plots DRS-induced OSNR versus wavelength for the same single-stage Raman amplifier. A dotted line plots DRS-induced OSNR versus wavelength for the same two-stage Raman amplifier. The effective area of all fiber sections is assumed to be 50 um$^2$, the DRS coefficient is assumed to be 10−7 m$^{-1}$. The attenuation coefficients for the signal and the pump are assumed to be 0.225 dB/km and 0.26 dB/km respectively.

FIG. 9 shows that the two amplifier configurations have almost identical gain and flatness. However, the amplifier architecture of FIG. 8 achieves at least a 10 dB improvement in the level of DRS-induced noise.

Figure 10:
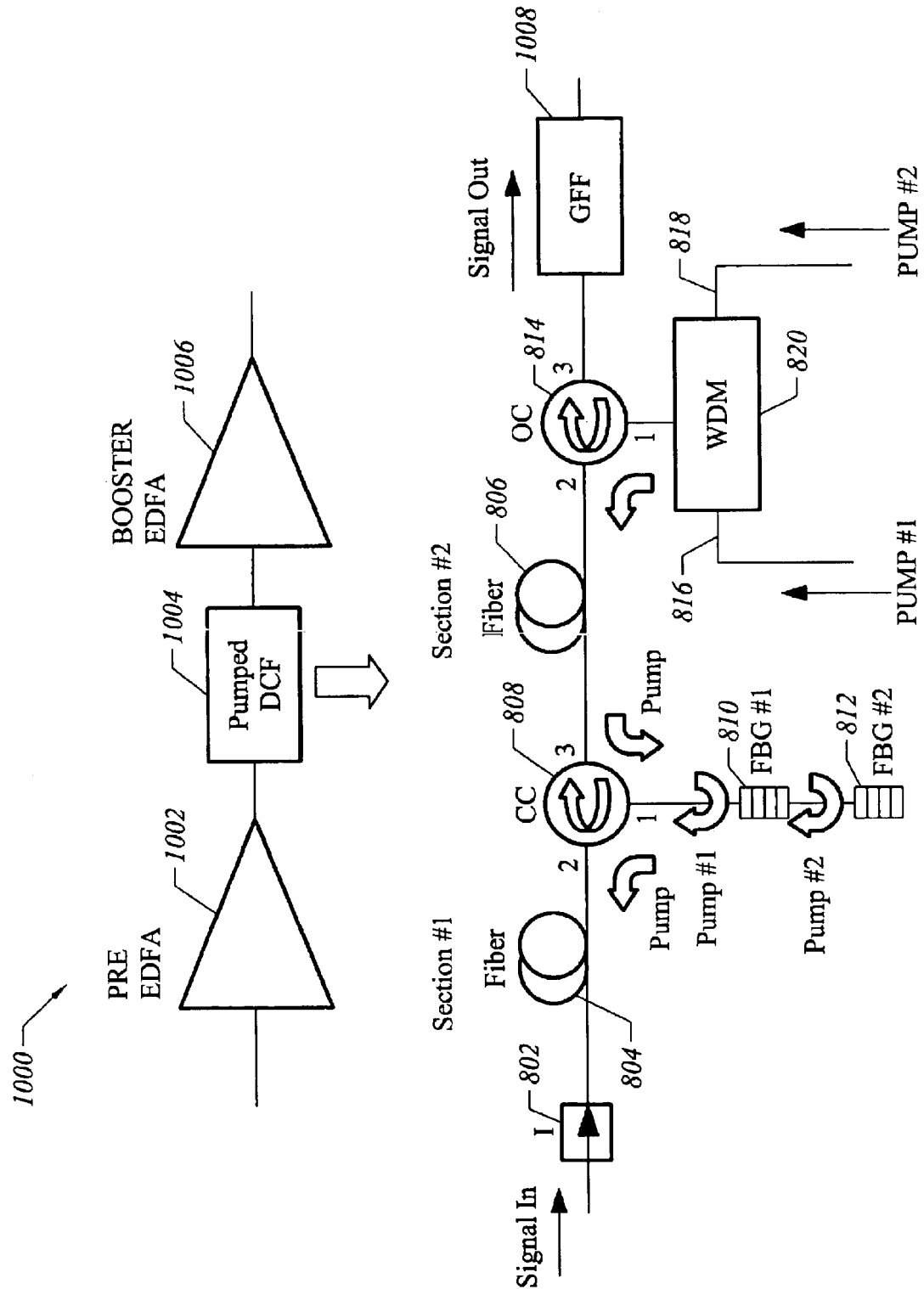
FIG. 10 depicts an embodiment of the present invention as applied to a dispersion compensation system.

FIG. 10 depicts an embodiment of the present invention as applied to a dispersion compensation system 1000. In WDM optical communication links, chromatic dispersion compensation may be performed by placing spools of dispersion compensating fiber at sites along the line. In order to compensate for attenuation in the line and within the dispersion compensating fiber, erbium-doped fiber amplifier (EDFA) technology may be exploited. Accordingly, dispersion compensation system 1000 includes a pre-EDFA 1002, a dispersion compensating fiber unit 1004, and a booster EDFA 1006. For improved noise figure performance, it is desirable to achieve Raman amplification within the dispersion compensating fiber of unit 1004 by injecting counter-propagating pump energy. In this way, unit 1004 may be made transparent.

According to one embodiment of the present invention, the dispersion compensating fiber of unit 1004 is divided into two stages and pump energy at two different wavelengths is distributed through the two stages in the same manner as depicted in FIG. 8. Unit 104 includes the components depicted in FIG. 8 as well as an additional gain flattening filter 1008. It will be appreciated that it is also possible to divide the fiber into three stages.

Figure 11:
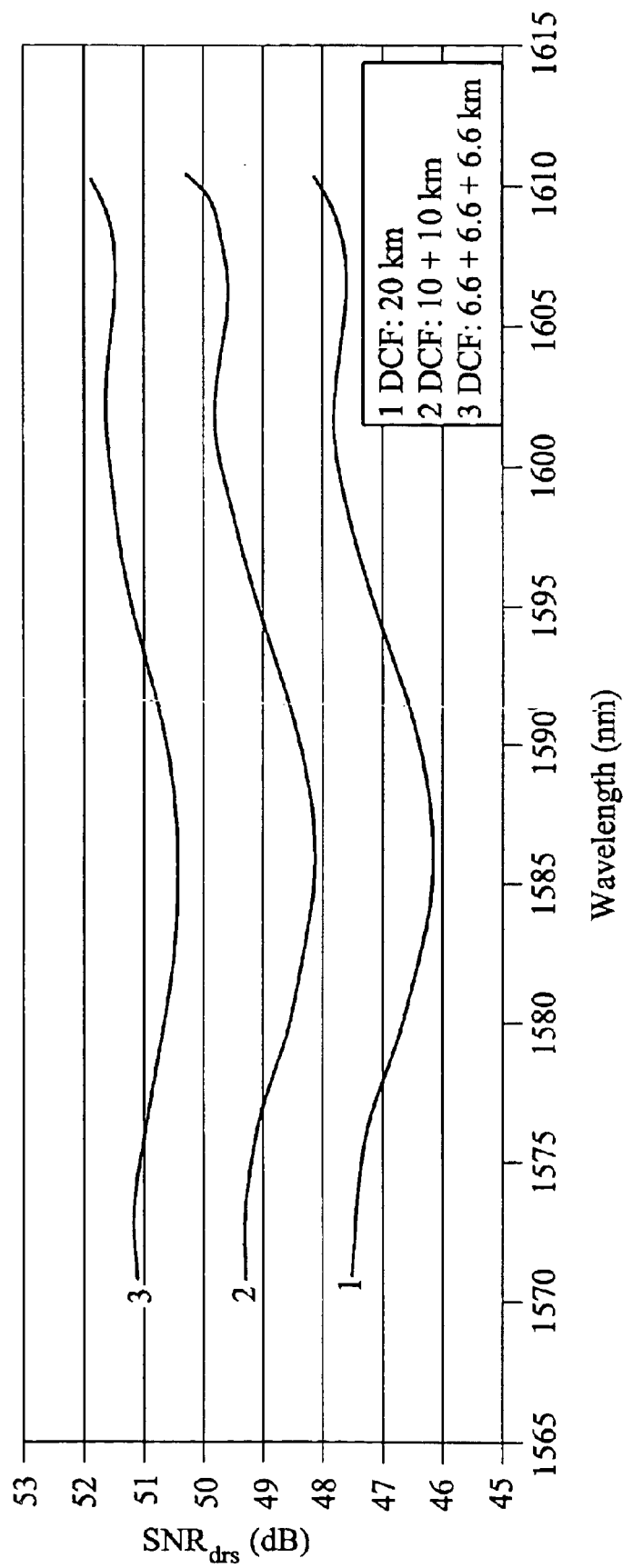
FIG. 11 depicts OSNR due to DRS noise versus wavelength for one, two, and three sections of pumped dispersion compensating fiber.

The configuration of FIG. 10 achieves great advantages in suppressing DRS noise. FIG. 11 depicts OSNR due to DRS noise versus wavelength for one, two, and three sections of pumped dispersion compensating fiber. For the one section configuration, the single section includes 20 km of dispersion compensating fiber. For the two section configuration, the two sections each include 10 km. For the three section configuration, the three sections each include 6.6 km of fiber. For each of the configurations plotted by FIG. 11, the dispersion compensating fiber is pumped so that the Raman gain compensates for attenuation loss and the net gain through unit 1004 is 0 dB. Only a slight increase in pump power is required when the dispersion compensating fiber is divided into three sections. It can be seen in FIG. 11 that it is possible to increase the minimum OSNR due to DRS noise from 46 dB to about 51 dB, a very beneficial improvement for ultra-long-haul applications.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. Apparatus for amplifying an optical signal, said apparatus comprising:

a pump system disposed to inject optical pump energy into a first end of a first fiber segment so as to counter-propagate relative to an optical signal traversing said first fiber segment and a second fiber segment; and an optical filter structure coupled to a second end of said first fiber segment and a first end of said second fiber segment; and wherein said optical signal propagates through said optical filter structure from said second fiber segment to said first fiber segment, said optical pump energy propagates trough said optical filter structure from said first fiber segment to said second fiber segment, and said optical filter structure substantially blocks energy at frequencies about an optical pump energy frequency, including a frequency of said optical signal, from traveling from said first fiber segment into said second fiber segment so that Raman amplification is induced in said first fiber segment and said second fiber segment and double Rayleigh backscattering effects are ameliorated.

2. Apparatus for amplifying an optical signal, said apparatus comprising:

a pump system disposed to inject optical pump energy into a first end of a first fiber segment so as to counter-propagate relative to an optical signal traversing said first fiber segment and a second fiber segment; and an optical filter structure coupled to a second end of said first fiber segment and a first end of said second fiber segment, said optical filter structure further comprising:

a circulator having a first port, a second port, and a third port; and a fiber Bragg grating configured to reflect optical energy at a frequency of said optical pump energy and to absorb optical energy at a frequency of said optical signal;

wherein said optical signal propagates through said optical filter structure from said second fiber segment to said first fiber segment, said optical pump energy propagates through said optical filter structure from said first fiber segment to said second fiber segment, and said optical filter structure substantially blocks energy at a frequency of said optical signal from traveling from said first fiber segment into said second fiber segment so that Raman amplification is induced in said first fiber segment and said second fiber segment and double Rayleigh backscattering effects are ameliorated.

3. The apparatus of claim 2 wherein said optical pump energy enters said third port of said circulator from said first fiber segment, exits said first port of said circulator, reflects from said fiber Bragg grating into said first port of said circulator and exits said second port of said circulator into said second fiber segment.

4. The apparatus of claim 2 wherein reflections of said optical signal enter said third port of said circulator from said first fiber segment, exit said first port of said circulator and are not reflected by said fiber Bragg grating.

5. The apparatus of claim 2 wherein said optical signal enters said second port of said circulator from said second fiber segment and exits said third port of said circulator into said first fiber segment.

6. The apparatus of claim 2 further comprising:

an isolator coupled to a second end of said first fiber segment and configured to pass optical energy into said first fiber segment via said second end and block optical energy from exiting said first fiber segment via said second end.

7. The apparatus of claim 2 further comprising:

said first fiber segment and said second fiber segment.

8. Apparatus for amplifying an optical signal, said apparatus comprising:

a pump system disposed to inject optical pump energy into a first end of a first fiber segment so as to counter-propagate relative to an optical signal traversing said first fiber segment and a second fiber segment; and an optical filter structure coupled to a second end of said first fiber segment and a first end of said second fiber segment; and an additional optical filter structure coupled to a second end of said second fiber segment and a first end of a third fiber segment;

wherein said optical signal propagates through said optical filter structure from said second fiber segment to said first fiber segment, said optical pump energy propagates through said optical filter structure from said first fiber segment to said second fiber segment, and said optical filter structure substantially blocks energy at a frequency of said optical signal from traveling from said first fiber segment into said second fiber segment so that Raman amplification is induced in said first fiber segment and said second fiber segment and double Rayleigh backscattering effects are ameliorated; and wherein said optical signal propagates through said additional optical filter structure from said third fiber segment to said second fiber segment, said optical pump energy propagates through said additional optical filter structure from said second fiber segment to said third fiber segment, and substantially blocks energy at a frequency of said optical signal from traveling from said second fiber segment into said third fiber segment so that Raman amplification is also induced in said third fiber segment.

9. The apparatus of claim 2 wherein said optical pump energy comprises:

a first optical pump signal at a first frequency; and a second optical pump signal at a second frequency.

10. A method for amplifying an optical signal, said method comprising:

injecting optical pump energy into a first end of a first fiber segment so that said optical pump energy counter-propagates relative to an optical signal traversing said first fiber segment and a second fiber segment, wherein injecting optical pump energy further comprises:

injecting a first optical pump signal at a first frequency; and injecting a second optical pump signal at a second frequency different than said first frequency;

passing said optical signal from said second fiber segment into a second end of said first fiber segment;

passing said optical pump energy from said first fiber segment into said second fiber segment; and blocking optical energy at frequencies about an optical pump energy frequency, including a frequency of said optical signal, from entering said second fiber segment from said first fiber segment.

11. A method for amplifying an optical signal, said method comprising:

injecting optical pump energy into a first end of a first fiber segment so that said optical pump energy counter-propagates relative to an optical signal traversing said first fiber segment and a second fiber segment;

passing said optical signal from said second fiber segment into a second end of said first fiber segment which comprises passing said optical signal from a first end of said second fiber segment into a second port of a circulator and out a third port of said circulator into said second end of said first fiber segment;

passing said optical pump energy from said first fiber segment into said second fiber segment; and blocking optical energy at a frequency of said optical signal, from entering said second fiber segment from said first fiber segment.

12. A method for amplifying an optical signal, said method comprising:

injecting optical pump energy into a first end of a first fiber segment so that said optical pump energy counter-propagates relative to an optical signal traversing said first fiber segment and a second fiber segment;

passing said optical signal from said second fiber segment into a second end of said first fiber segment;

passing said optical pump energy from said first fiber segment into said second fiber segment which comprises:

passing said optical pump energy from said second end of said fiber segment into a third port of a circulator and out a first port of said circulator;

reflecting said optical pump energy from a fiber Bragg grating and back into said first port of said circulator, out said second port of said circulator and into said second fiber segment; and blocking optical energy at a frequency of said optical signal, from entering said second fiber segment from said first fiber segment.

13. A method for amplifying an optical signal, said method comprising:

injecting optical pump energy into a first end of a first fiber segment so that said optical pump energy counter-propagates relative to an optical signal traversing said first fiber segment and a second fiber segment;

passing said optical signal from said second fiber segment into a second end of said first fiber segment;

passing said optical pump energy from said first fiber segment into said second fiber segment; and blocking optical energy at a frequency of said optical signal, from entering said second fiber segment from said first fiber segment which comprises:

passing said optical energy at said frequency of said optical signal into a third port of a circulator and out of said second port of said circulator; and absorbing said optical energy at a Fiber Bragg grating.

14. The method of claim 11 further comprising employing an isolator to block said optical pump energy from exiting a second end of said second fiber segment while permitting said optical signal to enter said second end of said second fiber segment.

15. The method of claim 11 wherein injecting optical pump energy comprises:

injecting a first optical pump signal at a first frequency; and injecting a second optical pump signal at a second frequency different than said first frequency.

16. Apparatus for amplifying an optical signal, said apparatus comprising:

means for injecting optical pump energy into a first end of a first fiber segment so that said optical pump energy counter-propagates relative to an optical signal traversing said first fiber segment and a second fiber segment; wherein said optical pump energy comprises a first pump signal at a first frequency and a second pump signal at a second frequency different than said first frequency;

wavelength-selective means for reflecting optical energy at a frequency of said pump energy, optical energy at a frequency of said optical signal being absorbed by said wavelength-selective reflecting means; and means for directing optical energy exiting a first end of said second fiber segment into a second end of said first fiber segment, for directing optical energy exiting said second end of said first fiber segment into said wavelength-selective reflecting means, and for directing optical energy reflecting from said wavelength-reflective means into said first end of said second fiber segment.

17. The apparatus of claim 16 wherein said wavelength-selective reflecting means comprises:

a first fiber Bragg grating configured to reflect optical energy at said first frequency; and a second fiber Bragg grating configured to reflect optical energy at said second frequency.

18. The apparatus of claim 8 wherein said optical filter structure comprises:

a first circulator having a first port, a second port, and a third port; and a first fiber Bragg grating configured to reflect optical energy at a frequency of said optical pump energy and to absorb optical energy at a frequency of said optical signal; and wherein said additional optical filter structure comprises:

a second circulator having a first port, a second port, and a third port; and a second fiber Bragg grating configured to reflect optical energy at a frequency of said optical pump energy and to absorb optical energy at a frequency of said optical signal.

19. The apparatus of claim 18 wherein said optical pump energy enters said third port of said first circulator from said first fiber segment, exits said first port of said first circulator, reflects from said first fiber Bragg grating into said first port of said first circulator and exits said second port of said first circulator into said second fiber segment; and wherein said optical pump energy enters said third port of said second circulator from said second fiber segment, exits said first port of said second circulator, reflects from said second fiber Bragg grating into said first port of said second circulator and exits said second port of said second circulator into said third fiber segment.

20. The apparatus of claim 18 wherein reflections of said optical signal enter said third port of said first circulator from said first fiber segment, exit said first port of said first circulator and are not reflected by said first fiber Bragg grating; and wherein reflections of said optical signal enter said third port of said second circulator from said second fiber segment, exit said first port of said second circulator and are not reflected by said second fiber Bragg grating.

21. The apparatus of claim 18 wherein said optical signal enters said second port of said second circulator from said third fiber segment and exits said third port of said second circulator into said second fiber segment; and wherein said optical signal enters said second port of said first circulator from said second fiber segment and exits said third port of said first circulator into said first fiber segment.

22. The apparatus of claim 8 further comprising:
an isolator coupled to a second end of said first fiber segment and configured to pass optical energy into said first fiber segment via said second end and block optical energy from exiting said first fiber segment via said second end.

23. The apparatus of claim 8 further comprising:
said first fiber segment, said second fiber segment and said third fiber segment.

24. The apparatus of claim 8 wherein said optical pump energy comprises:
a first optical pump signal at a first frequency; and
a second optical pump signal at a second frequency.

25. The apparatus of claim 1 wherein said optical filter structure comprises:
a circulator having a first port, a second port, and a third port; and
a fiber Bragg grating configured to reflect optical energy at said optical pump energy frequency and to absorb optical energy at a frequency of said optical signal.

26. The apparatus of claim 2 wherein said optical pump energy enters said third port of said circulator from said first fiber segment, exits said first port of said circulator, reflects from said fiber Bragg grating into said first port of said circulator and exits said second port of said circulator into said second fiber segment.

27. The apparatus of claim 25 wherein reflections of said optical signal enter said third port of said circulator from said first fiber segment, exit said first port of said circulator and are not reflected by said fiber Bragg grating.

28. The apparatus of claim 25 wherein said optical signal enters said second port of said circulator from said second fiber segment and exits said third port of said circulator into said first fiber segment.

29. The apparatus of claim 1 further comprising:
an isolator coupled to a second end of said first fiber segment and configured to pass optical energy into said first fiber segment via said second end and block optical energy from exiting said first fiber segment via said second end.

30. The apparatus of claim 1 further comprising:
said first fiber segment and said second fiber segment.

31. The apparatus of claim 1 further comprising:
an additional optical filter structure coupled to a second end of said second fiber segment and a first end of a third fiber segment;
wherein said optical signal propagates through said additional optical filter structure from said third fiber segment to said second fiber segment, said optical pump energy propagates through said additional optical filter structure from said second fiber segment to said third fiber segment, and substantially blocks energy at frequencies about said optical pump frequency, including a frequency of said optical signal, from traveling from said second fiber segment into said third fiber segment so that Raman amplification is also induced in said third fiber segment and double Rayleigh backscattering effects are ameliorated.

32. The apparatus of claim 1 wherein said optical pump energy comprises:
a first optical pump signal at a first frequency; and
a second optical pump signal at a second frequency.

33. The method of claim 12 further comprising employing an isolator to block said optical pump energy from exiting a second end of said second fiber segment while permitting said optical signal to enter said second end of said second fiber segment.

34. The method of claim 12 wherein injecting optical pump energy comprises:
injecting a first optical pump signal at a first frequency; and
injecting a second optical pump signal at a second frequency different than said first frequency.

35. The method of claim 13 further comprising employing an isolator to block said optical pump energy from exiting a second end of said second fiber segment while permitting said optical signal to enter said second end of said second fiber segment.

36. The method of claim 13 wherein injecting optical pump energy comprises:
injecting a first optical pump signal at a first frequency; and
injecting a second optical pump signal at a second frequency different than said first frequency.

* * * * *